(12) United States Patent
Shimizu

(10) Patent No.: US 8,310,755 B2
(45) Date of Patent: Nov. 13, 2012

(54) REFLECTION-TYPE SCREEN, PROJECTION SYSTEM, FRONT PROJECTION TELEVISION SYSTEM, AND REFLECTION-TYPE SCREEN MANUFACTURING METHOD

(75) Inventor: Nobuo Shimizu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/081,901

(22) Filed: Apr. 7, 2011

(65) Prior Publication Data

US 2011/0249200 A1 Oct. 13, 2011

(30) Foreign Application Priority Data

Apr. 9, 2010 (JP) ................................ 2010-090159

(51) Int. Cl.
*G03B 21/60* (2006.01)

(52) U.S. Cl. ...................................... 359/443; 359/459

(58) Field of Classification Search .................. 359/443, 359/449

See application file for complete search history.

(56) References Cited

U.S. PATENT DOCUMENTS

| 8,111,457 B2 * | 2/2012 | Akiyama | 359/443 |
| 2010/0039703 A1 * | 2/2010 | Akiyama | 359/459 |
| 2010/0157424 A1 * | 6/2010 | Katsuma et al. | 359/455 |

FOREIGN PATENT DOCUMENTS

| JP | A-2006-215162 | 8/2006 |
| JP | A-2009-015195 | 1/2009 |
| JP | A-2009-192970 | 8/2009 |

* cited by examiner

*Primary Examiner* — Clayton E Laballe
*Assistant Examiner* — Kevin Butler
(74) *Attorney, Agent, or Firm* — Oliff & Berridge, PLC

(57) ABSTRACT

A reflection-type screen which reflects projection light from a projector is provided. The screen includes a base one surface of which has a plurality of curved portions having concave or convex surfaces. Each of the curved portions of the base has a reflection area and a non-reflection area. A reflection film is formed on each of the reflection areas. An anti-reflection film is formed on each of the non-reflection areas. Each of the anti-reflection films has a plurality of transparent columnar components.

12 Claims, 9 Drawing Sheets

REFLECTION-TYPE SCREEN, PROJECTION SYSTEM, FRONT PROJECTION TELEVISION SYSTEM, AND REFLECTION-TYPE SCREEN MANUFACTURING METHOD

BACKGROUND

1. Technical Field

The present invention relates to a reflection-type screen, a projection system, a front projection television system, and a reflection-type screen manufacturing method.

2. Related Art

A reflection-type screen which receives projection light from a projector or the like and reflects the projection light to display a visually recognizable image is known. A known example of this reflection-type screen is a type which has a number of convex units having uniform shapes disposed two-dimensionally on the front surface of a screen base to which an image is projected (JP-A-2006-215162).

The reflection-type screen disclosed in JP-A-2006-215162 has a reflection surface only on a part of each front surface area of the units facing to the incident direction of the projection light. For example, when the projection image is applied to the reflection-type screen in the diagonally upward direction from the projector disposed on the front side of the reflection-type screen at a position diagonally below the reflection-type screen, the reflection surface for reflecting the projection light is not provided on the upper area of each unit to which the projection light is not applied but is provided only on the lower area of each unit to which the projection light is applied. The reflection surface formed on each lower area of the units can reflect a larger amount of the projection light received from the projector toward the front of the reflection-type screen corresponding to the image viewing side to increase the contrast of the projection image.

According to the reflection-type screen disclosed in JP-A-2006-215162, however, external light other than the projection light such as illumination light from the ceiling is reflected toward the image viewing side when applied to the area of each unit where the reflection surface is not provided. In this case, the reflection of the external light toward the image viewing side may increase the black luminance in the screen characteristics and lower the contrast.

SUMMARY

An advantage of some aspects of the invention is to provide a reflection-type screen, a projection system, a front projection television system, and a reflection-type screen manufacturing method capable of achieving improvement of contrast by simplified structure.

A reflection-type screen which reflects projection light according to an aspect of the invention includes a base one surface of which has a plurality of curved portions having concave or convex surfaces. Each of the curved portions of the base has a reflection area and a non-reflection area. A reflection film is formed on each of the reflection areas. An anti-reflection film is formed on each of the non-reflection areas. Each of the anti-reflection films has a plurality of diagonally deposited transparent columnar components.

According to this aspect of the invention, the plural curved portions having concave surfaces or convex surfaces are formed on the one surface of the base. The reflection area and the non-reflection area are formed on each of the curved portions. The reflection area and the non-reflection area are determined according to the types of projector used in conjunction with the reflection-type screen or the like. For example, in case of the reflection-type screen for a projector placed close to the screen, the area of each curved portion for receiving projection light is determined according to the incident angle of projection light released from the projector and entering the curved portion. Thus, the area receiving the projection light is determined as the reflection area, while the area other than the reflection area is determined as the non-reflection area. These areas can be established at the time of design of the screen.

According to this aspect of the invention, the reflection film is formed on each of the reflection areas of the plural curved portions, and the anti-reflection film having so-called moth-eye structure which contains a plurality of diagonally deposited transparent columnar components is formed on each of the non-reflection areas.

According to this structure, external light coming in a direction different from the direction of the projection light toward the base is applied to the anti-reflection films on the non-reflection areas, and thus is not reflected toward the image viewing side by the function of the anti-reflection films having so-called moth-eye structure. In this case, the black luminance in the screen characteristics does not rise, which prevents lowering of the contrast of the projection light reflected by the reflection films. Accordingly, the contrast easily improves by the simple structure which contains the anti-reflection films having the plural diagonally deposited transparent columnar components.

It is preferable that, in the aspect of the invention, each of the anti-reflection films is made of silicon dioxide.

According to this structure, the anti-reflection films are formed by diagonal deposition of silicon dioxide. In this case, the reflection films thus formed have a smaller refractive index than that of reflection films made of other materials such as titanium dioxide and tin dioxide. Moreover, while other materials such as magnesium fluoride have low adhesion at room temperature during film forming and thus cannot be formed on a base made of resin, diagonally deposited silicon dioxide has high adhesion at room temperature and thus can be formed on a base made of resin. Thus, when silicon dioxide is diagonally deposited on the base to form the anti-reflection films, limitations to the type of material of the base can be reduced. Accordingly, this aspect of the invention can be applied to various products.

In the aspect of the invention, it is preferable that the base is black.

According to this structure, the black luminance of the base does not greatly rise due to the black color of the base even when the base is exposed through an area where the reflection film or the anti-reflection film is not formed. Thus, deterioration of the contrast can be avoided even in this situation. Accordingly, the process for forming the reflection films and the anti-reflection films can be facilitated without the necessity of high positional accuracy for formation of the reflection films and the anti-reflection films.

A projection system according to another aspect of the invention includes: the reflection-type screen described above; and a projector which projects projection light on the surface of the reflection-type screen on which the curved portions are provided.

A front projection television system according to still another aspect of the invention includes: the reflection-type screen described above; a projection unit which projects projection light on the surface of the reflection-type screen on which the curved portions are provided; and a frame on which the reflection-type screen and the projection unit are held.

The projection system and the front projection television system according to the aspects of the invention include the reflection-type screen described above. Thus, advantages similar to those of the reflection-type screen described above can be offered. Accordingly, preferable contrast can be produced by sufficient prevention against rising of the black luminance.

A method for manufacturing a reflection-type screen which reflects projection light according to yet another aspect of the invention includes: forming a base one surface of which has a plurality of curved portions having concave or convex surfaces; determining a non-reflection area on each of the curved portions of the base, and forming an anti-reflection film having a plurality of transparent columnar components on each of the non-reflection areas by diagonal deposition; and determining a reflection area on each of the curved portions of the base, and forming a reflection film on each of the reflection areas.

According to this aspect of the invention, the material of the anti-reflection films such as silicon dioxide is diagonally deposited from the position facing to the non-reflection areas determined for each curved portion of the base to form the anti-reflection films having the plural transparent columnar components in the step for forming the anti-reflection films. In addition, the reflection films are formed on the reflection areas of the curved portions in the step for forming the reflection films.

In this case, external light is not reflected toward the image viewing side by the function of the anti-reflection films having the so-called moth-eye structure described above. Accordingly, the reflection-type screen which prevents rising of the black luminance in the base characteristics to avoid lowering of the contrast can be manufactured.

In this aspect of the invention, it is preferable that each of the reflection films is formed on the reflection area of the corresponding curved portion of the base by diagonal deposition.

According to this method, the material of the reflection films such as aluminum is diagonally deposited from the position facing to the reflection areas determined for each curved portion of the base to form the reflection films. Thus, the reflection films can be formed on the reflection areas with self-alignment by establishing the relationship between the position of the evaporation source where the material of the reflection films is placed and the positions of the respective reflection areas such that this relationship becomes substantially equivalent to the relationship between the position of the projector at the time of projection of the projection light to the screen and the positions of the respective reflection areas. Thus, the reflection-type screen described above can be easily manufactured without the necessity of other processing such as masking and etching.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment according to the invention is hereinafter described with reference to the drawings.

Screen

Figure 1:
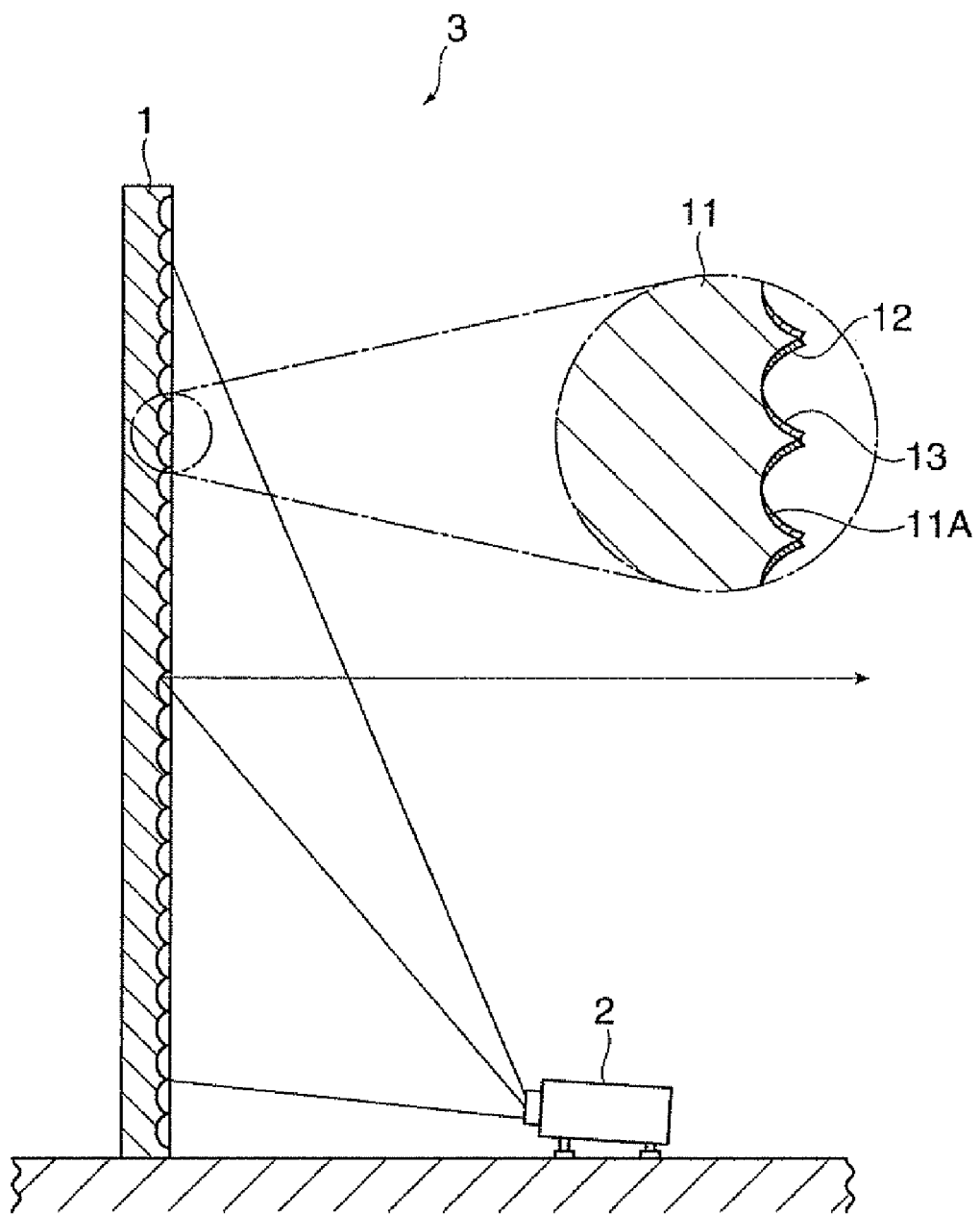
FIG. 1 illustrates the general structure of an image projection system including a reflection-type screen according to an embodiment of the invention.

FIG. 1 illustrates an example of an image projection system 3 including a screen 1 according to an embodiment of the invention. The image projection system 3 has the screen 1 and a projector (projection apparatus) 2.

The screen 1 is a reflection-type screen which receives a projection image from the projector 2 and reflects the projection image so that an observer located on the image viewing side can visually recognize the image on the screen 1.

The projector 2 is a close projection type projector placed close to the screen 1 (such as a projector requiring a projection distance of only about 60 cm), for example.

The projection light released from the projector is reflected by the screen 1 so that an image corresponding to the reflected light can be viewed by the observer positioned in front of the screen 1.

The screen 1 has an optical function which reflects the projection light received from the projector toward the observer side with high efficiency and displays the projection light on the screen 1 with high visibility. More specifically, the screen 1 is so constructed as to have a predetermined angle of visibility (preferable contrast at a predetermined angle) by formation of concave portions (curved portions having concave surfaces) 11A and reflection films 12 and anti-reflection films 13 provided on the respective concave portions 11A described later. The details of the screen 1 according to this embodiment are herein described.

As illustrated in FIG. 1, the screen 1 has a base 11. The base 11 has a number of the concave portions 11A as curved portions having concave surfaces on one surface to which projection light is applied. Each of the concave portions 11A has a substantially hemispherical concave surface.

The material of the base 11 is not specifically limited but may be any types generally used as the material of the screen 1. Specific examples of the material of the base 11 include ultraviolet hardening resin and silicon rubber. It is preferable that the base is made of such material which is easily separable from a mold in a process of a screen manufacturing method described later.

Figure 2:
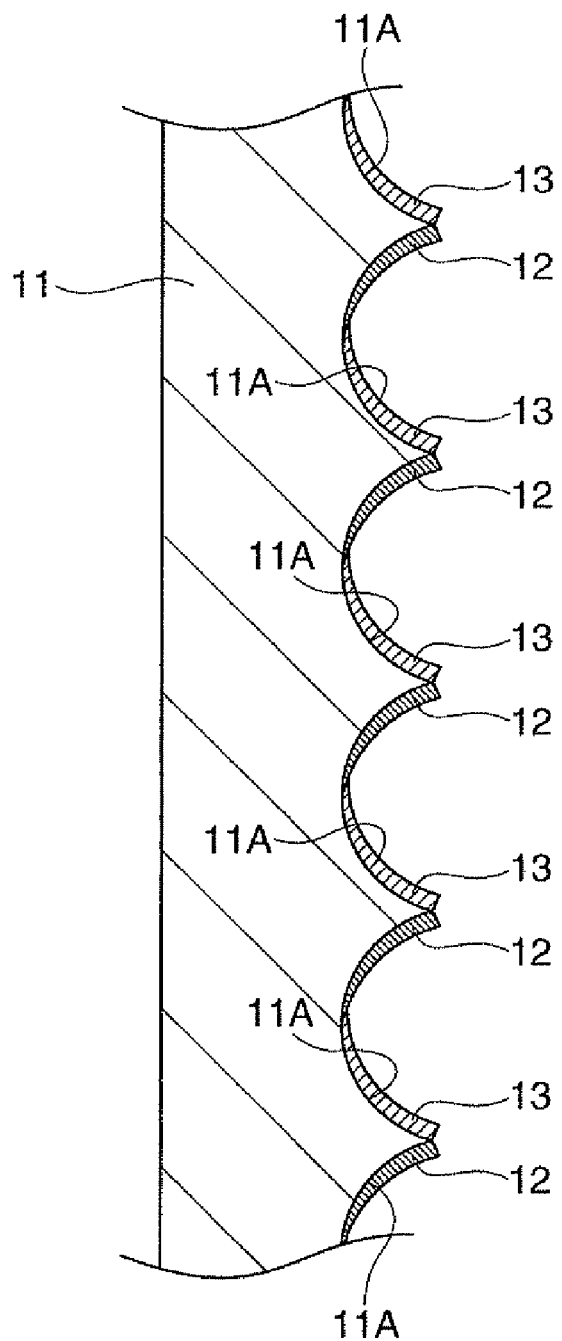
FIG. 2 is a cross-sectional view illustrating a part of the reflection-type screen according to the embodiment.

As illustrated in FIGS. 1 and 2, the screen 1 has the reflection film 12 and the anti-reflection film 13 formed on each concave surface of the concave portions 11A. FIGS. 1 and 2 show the concave portions 11A expanded at a larger ratio of the sizes of the concave portions 11A to the size of the base 11 than the actual corresponding ratio for easy understanding of the figures. Similarly, the reflection films 12 and the anti-reflection films 13 are expanded at a larger ratio of the sizes of the reflection films 12 and the anti-reflection films 13 to the sizes of the concave portions 11A than the actual corresponding ratio.

According to the screen 1, the exposed area of each of the reflection films 12 corresponds to a reflection area provided as an area which receives projection light from the projector 2 placed at a predetermined set position and reflects the projection light toward the observer side with high efficiency. On the other hand, the exposed area of each of the anti-reflection films 13 corresponds to a non-reflection area provided as an area other than the reflection area to which the projection light from the projector 2 placed at the predetermined set position is not applied.

More specifically, since the angles of the projection light applied to the concave portions 11A positioned on the upper part of the screen 1 in the vertical direction (upper part in the figure) are different from the angles of the projection light applied to the concave portions 11A positioned on the lower part of the screen 1 in the vertical direction (lower part in the figure) as illustrated in FIG. 1, the positions determined as the locations of the reflection areas on the respective concave portions 11A are varied according to the positions of the concave portions 11A on the screen 1. In this arrangement, the reflection areas are disposed on areas facing to a position corresponding to the location of the projector 2 placed at a predetermined position for the screen 1. Thus, the reflection films 12 are formed on the determined reflection areas with self-alignment by diagonal deposition from the position corresponding to the location of the projector 2 placed relative to the screen 1. The details of this point will be described later.

On the other hand, the non-reflection areas are areas not receiving the projection light released from the projector 2 placed at the predetermined location from the screen 1 after setting as areas not requiring the reflection films 12. For increasing the contrast by preventing reflection of light such as illumination light from the ceiling or the like on the non-reflection areas, the anti-reflection films 13 are formed on the non-reflection areas. The anti-reflection films 13 are formed on the determined non-reflection areas by diagonal deposition from the position facing to the non-reflection areas similarly to the reflection films 12. The details of this point will be described later.

As can be understood, the reflection films 12 on the screen 1 become the reflection surfaces which efficiently reflect the projection light received from the projector 2 and display an image. Moreover, the anti-reflection films 13 on the screen 1 prevent reflection of external light coming in a direction different from the direction of the projection light from the projector 2 such as illumination light from the ceiling to avoid lowering of the contrast caused by increase in the black luminance on the screen 1.

The shapes of the concave portions 11A are not limited to the uniform plural shapes arranged in this embodiment but may be shapes having different curvatures and different diameters. In addition, the shapes of the concave portions 11A are not limited to the hemispherical shapes but may be elliptical hemispherical shapes or other shapes.

It is preferable that the base 11 is black. The base 11 may be made black by using material containing pigment, dye or the like, or by surface treatment for black after the base 11 is produced.

The material of the reflection films 12 is not specifically limited but may be any types as long as they have high reflectance. Examples of the material of the reflection films 12 include aluminum (Al) and silver (Ag). It is preferable that the reflection films 12 are made of aluminum considering the material cost and handling easiness. The use of material having high reflectance increases the efficiency of reflecting the projection light released from the close projection type projector 2, and thus allows display of a bright image. Thin films such as protection films (not shown) may be further provided on the reflection films 12 as necessary.

The thickness of each of the reflection films 12 may be determined as a thickness appropriate for the material of the reflection films 12 and the type of the screen 1.

As explained above, the reflection films 12 are formed with self-alignment by diagonal deposition of the material of the reflection films 12 (see FIG. 6) on the reflection areas provided as areas for receiving the projection light from the projector 2 located at the predetermined position and efficiently reflecting the projection light. The details of this point will be described later.

The material of the anti-reflection films 13 is not specifically limited but may be any types as long as they have low refractive indexes. For example, the anti-reflection films 13 may be made of titanium dioxide ($TiO_2$, refractive index: 2.2 to 2.4), zirconium dioxide ($ZrO_2$, refractive index: 2.20), silicon dioxide ($SiO_2$, refractive index: 1.40 to 1.48), magnesium fluoride ($MgF_2$, refractive index: 1.39), calcium fluoride ($CaF_2$, refractive index: 1.39), cerium dioxide ($CeO_2$, refractive index: 2.45), tin dioxide ($SnO_2$, refractive index: 2.30), tantalum oxide (V) ($Ta_2O_5$, refractive index: 2.12), or indium oxide ($In_2O_3$, refractive index: 2.00), considering deposition easiness, light-transmissibility and the like.

As explained above, the anti-reflection films 13 made of silicon dioxide have a smaller refractive index than that of the anti-reflection films 13 made of other materials such as titanium dioxide and tin dioxide. In addition, the anti-reflection films 13 made of silicon dioxide have higher adhesion at room temperature than that of the anti-reflection films 13 made of other materials such as magnesium fluoride having a small refractive index, and thus can be formed on the base 11 made of resin. Moreover, silicon dioxide is material easily handled, and is widely distributed as material easily available. For these reasons, it is preferable that the anti-reflection films 13 are made of silicon dioxide.

Figure 3:
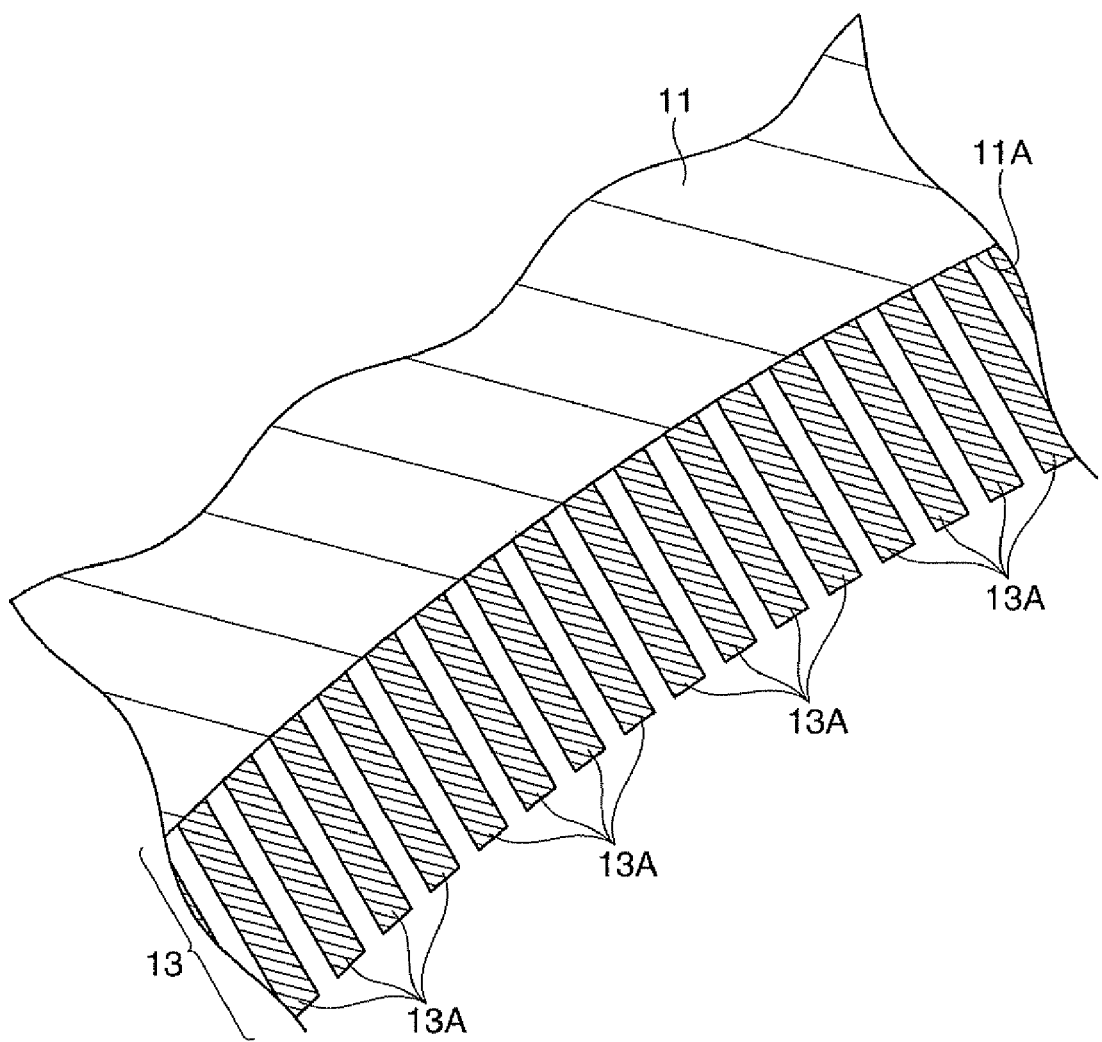
FIG. 3 is a cross-sectional view of the general structure of columnar components contained in an anti-reflection film provided on a concave portion according to the embodiment.

In forming the anti-reflection films 13, the material of the anti-reflection films 13 is diagonally deposited on the non-reflection areas of the concave portions 11A determined in the manner described above (see FIG. 5). The details of this point will be described later. The anti-reflection films 13 formed by diagonal deposition have so-called moth-eye structure which has a plurality of transparent columnar components 13A disposed such that the axes of the columnar components 13A extend in the diagonal deposition directions as illustrated in FIG. 3, for example. That is, the anti-reflection films 13 formed by diagonal deposition have moth-eye structure produced by the arrangement of the columnar components 13A smaller than the wavelength of visible light. The moth-eye structure of the anti-reflection films 13 reduces variations in the refractive index of the light entering from the air into the anti-reflection films 13 to prevent reflection of the light.

It is preferable that each thickness of the anti-reflection films 13 lies in the range from 800 to 1,000 angstroms. When the thickness is smaller than 800 angstroms or larger than 1,000 angstroms, the reflectance of the anti-reflection films 13 increases.

The anti-reflection films 13 may be provided in such positions as to produce clearances with the corresponding reflection films 12. That is, the concave portions 11A may contain uncovered parts. Also the reflection films 12 may have parts laminated on the corresponding anti-reflection films 13.

Screen Manufacturing Method

A screen manufacturing method according to this embodiment is now described.

Figure 4:
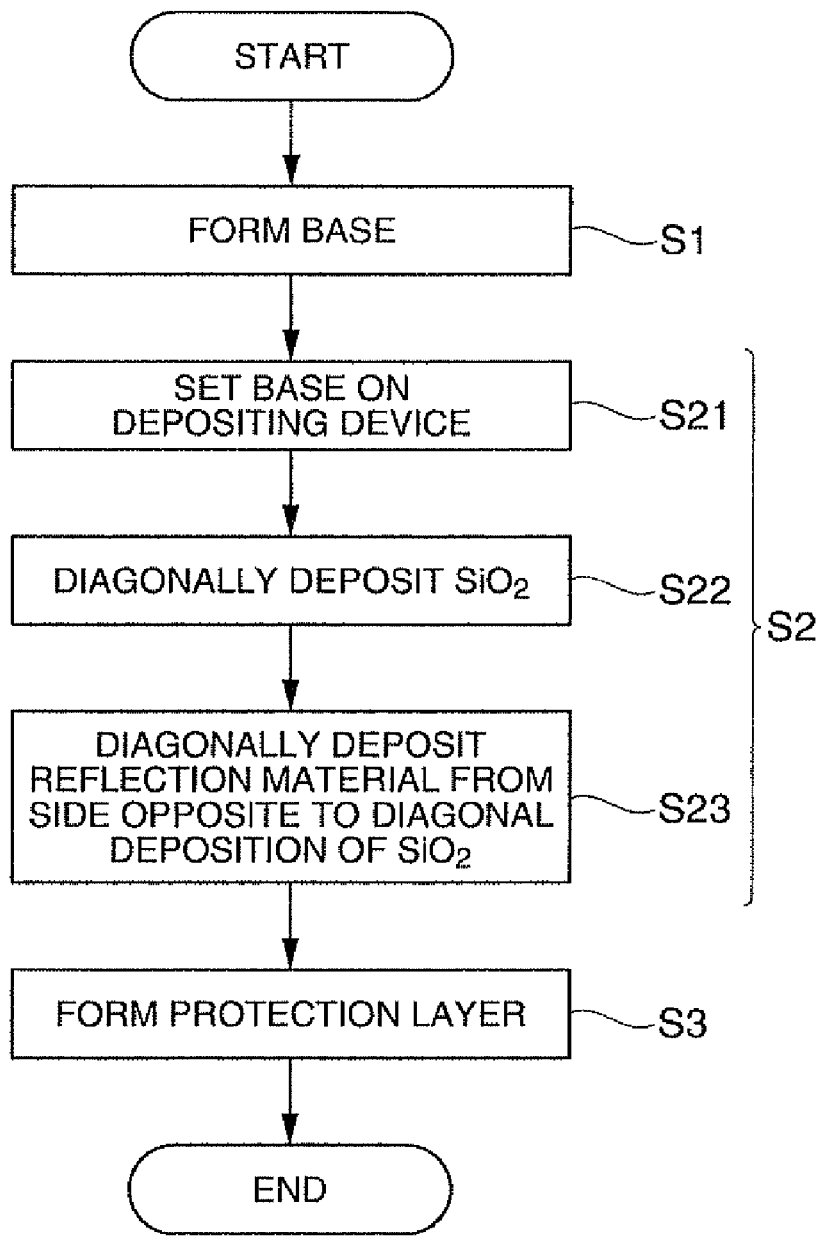
FIG. 4 is a flowchart showing steps for manufacturing the reflection-type screen according to the embodiment.
Figure 5:
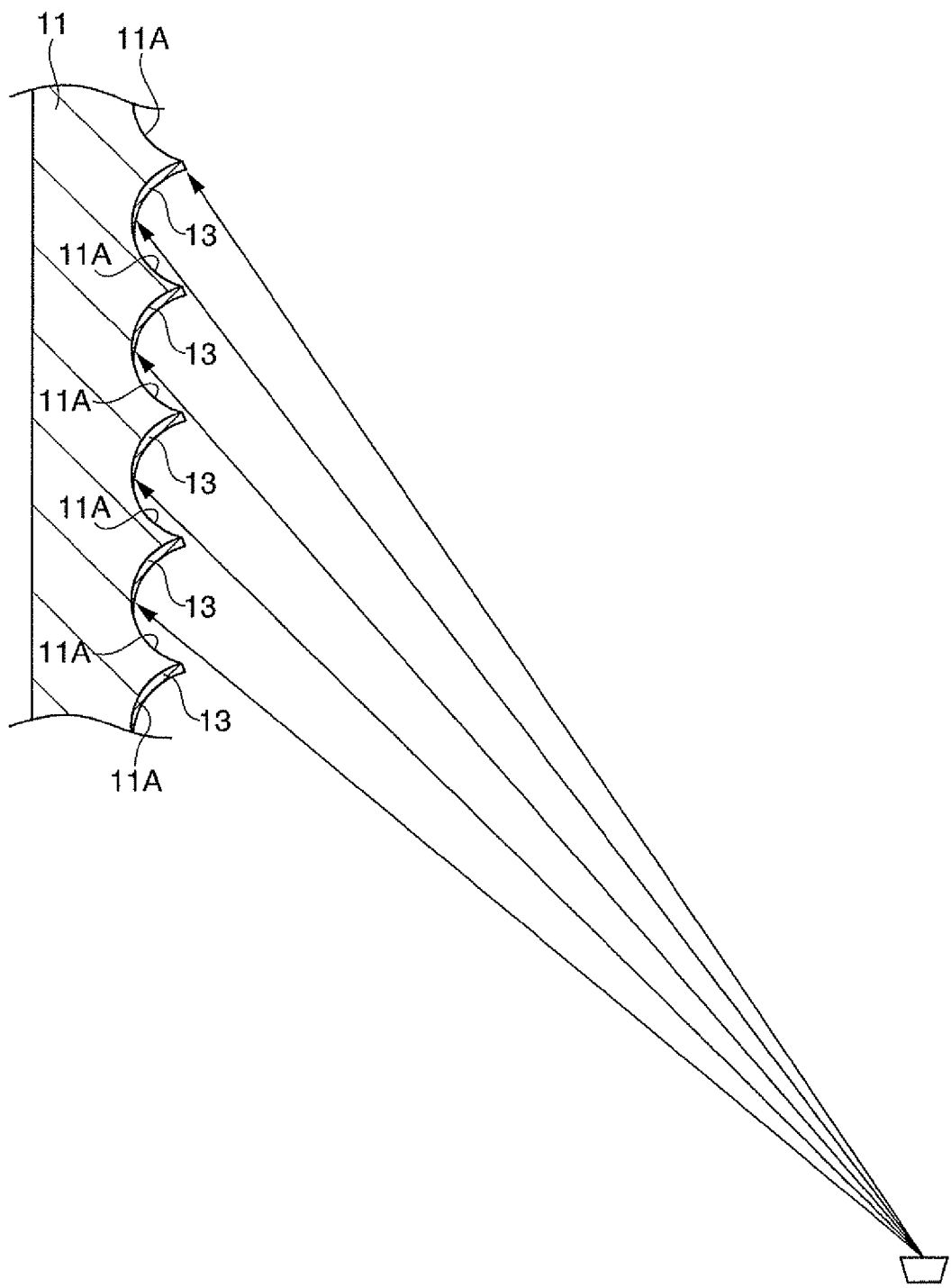
FIG. 5 illustrates a step for forming the anti-reflection films by diagonal deposition according to the embodiment.
Figure 6:
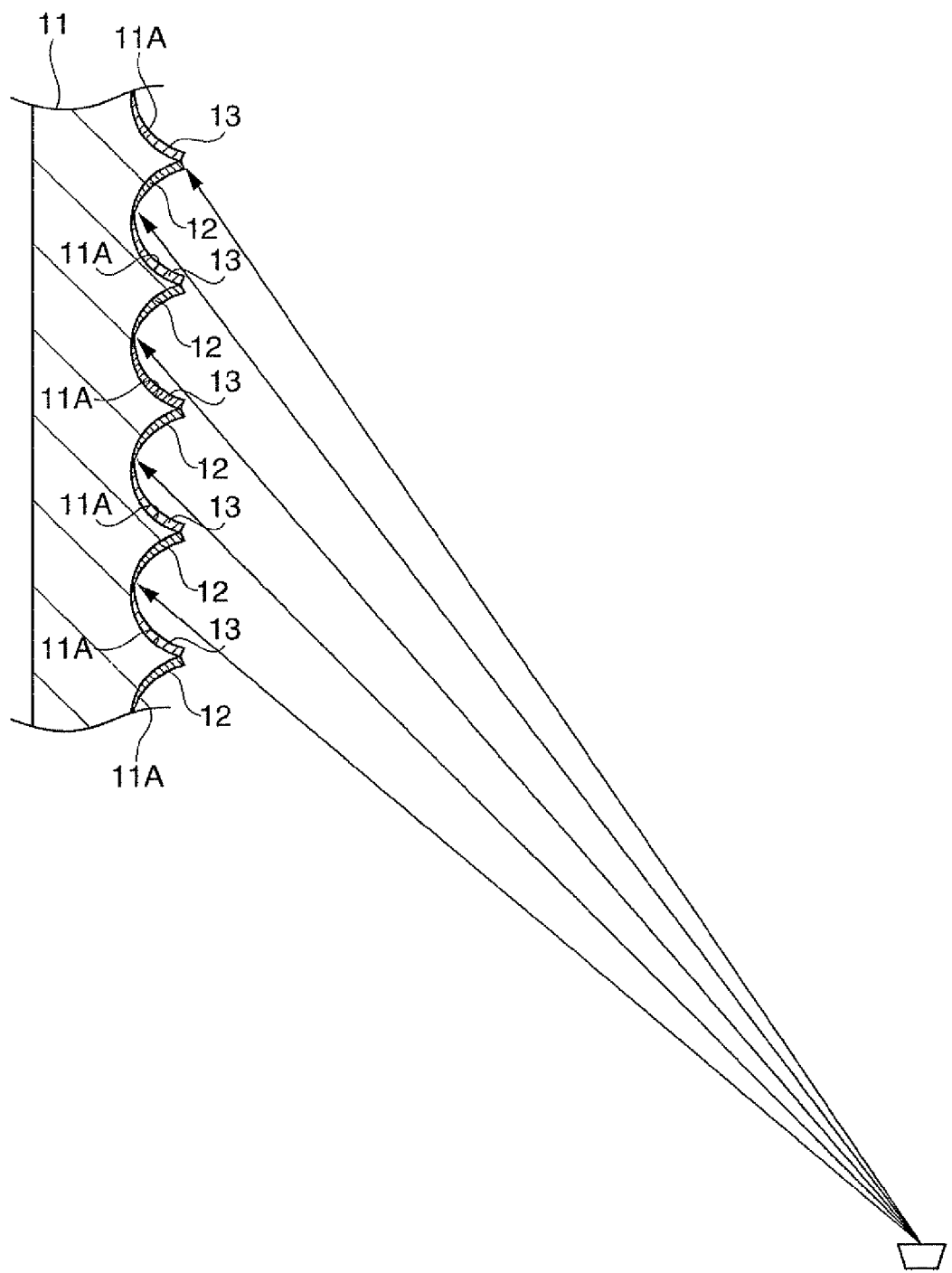
FIG. 6 illustrates a step for forming reflection films by diagonal deposition according to the embodiment.
Figure 7:
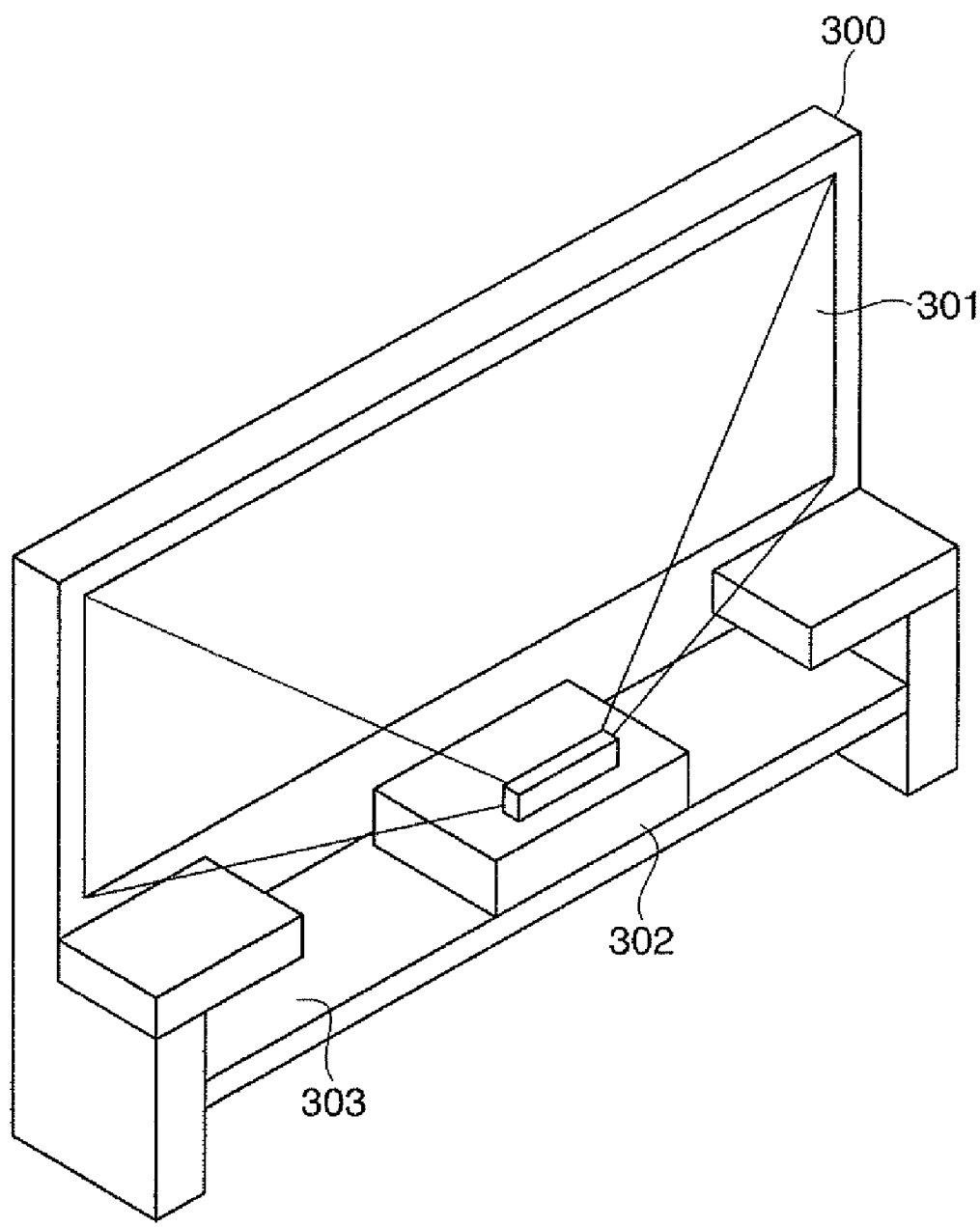
FIG. 7 is a perspective view illustrating a front projection television system according to a modified example of the invention.

FIG. 4 is a flowchart showing respective steps included in the screen manufacturing method. FIG. 5 illustrates a step for forming the anti-reflection films by diagonal deposition. FIG. 6 illustrates a step for forming the reflection films by diagonal deposition.

As shown in FIG. 4, a base forming step S1 is initially performed in the manufacture of the screen 1 to form the base 11 by transfer molding using a not-shown screen mold.

In the base forming step S1, ultraviolet hardening resin used as the material of the base 11, for example, is spread through the screen mold by spin-coating, and hardened by ultraviolet rays applied to the resin. Subsequently, the resin is separated from the screen mold to form the base 11 on which the concave portions 11A are provided.

It is preferable that the base 11 is made of material easily separable from a mold for molding of the base 11. However, material not easily separable from a mold can be used when a mold separating agent is applied to the transfer surface of the screen mold.

After the base forming step S1, a base processing step S2 for forming the reflection films 12 and the anti-reflection films 13 is performed.

More specifically, a setting step S21 for setting the base 11 formed in the base forming step S1 on a not-shown depositing device is initially executed in the base processing step S2.

Then, as shown in FIG. 5, an anti-reflection film forming step S22 for diagonally depositing $SiO_2$ on the base 11 to form the anti-reflection films 13 on the base 11 is executed.

As illustrated in FIG. 1, the projection light released from the projector 2 placed at the predetermined position set relative to the position of the screen 1 is applied to the screen 1 in a predetermined angle range for the plane of the screen 1. In this case, the position of the projector 2 placed at the predetermined position determined relative to the screen 1 corresponds to the deposition position facing to the reflection areas provided on the respective concave portions 11A. Thus, the reflection films 12 are deposited within an angle range corresponding to the angle range of the projection light supplied from the projector 2 for the plane of the screen 1. On the other hand, the non-reflection areas on which the reflection films 12 are not provided are disposed at positions opposite to the positions of the reflection areas determined for the entire concave surfaces of the respective concave portions 11A. In this case, the position facing to the non-reflection areas provided on the respective concave portions 11A is determined as the position 180° opposite to the position of the projector 2 placed relative to the screen 1 with respect to the normal line passing the center of the plane of the screen 1. Thus, the anti-reflection films 13 can be formed on the non-reflection areas by disposing silicon dioxide as the evaporation source at this position and diagonally depositing the evaporation source therefrom.

Accordingly, the deposition angle range for diagonal deposition of the material of the anti-reflection films 13 on the concave portions 11A of the screen 1 is determined as an angle range substantially equivalent to the angle range of the projection light applied from the projector 2.

It is preferable that the deposition angle is 10° or larger and smaller than 90° for the plane of the base 11. When the deposition angle for diagonal deposition is smaller than 10° for the plane of the base 11, the evaporated material is not sufficiently applied to the base 11. In this case, the anti-reflection films 13 cannot be appropriately formed.

On the other hand, when deposition is carried out at the deposition angle of 90°, i.e., in the normal line direction, the refractive index of the anti-reflection films 13 does not decrease enough. In this case, sufficient contrast improvement may be difficult to achieve due to insufficient decrease in the reflectance.

When the anti-reflection films 13 are formed by diagonal deposition under the condition described above while controlling each thickness to a length within the range from 800 to 1,000 angstroms, for example, the anti-reflection film forming step S22 ends.

After the anti-reflection film forming step S22, a reflection film forming step S23 is executed. As illustrated in FIG. 6, the reflection film forming step S23 forms the reflection films 12 with self-alignment by diagonal deposition of aluminum from the position facing to the reflection areas discussed above.

After the reflection film forming step S23 of the base processing step S2, a surface processing step S3 for forming protection films or the like is executed in an appropriate manner to complete manufacture of the screen 1.

Advantages of Embodiment

According to this embodiment, the reflection films 12 are formed on the reflection areas determined on the plural concave portions 11A having concave surfaces and provided on the base 11. In addition, the anti reflection films 13 having the plural diagonally deposited transparent columnar components 13A are formed on the non-reflection areas determined on the concave portions 11A of the base 11.

In this structure, external light applied to the non-reflection areas to which projection light is not applied is not reflected toward the image viewing side by the function of the anti-reflection films 13. Thus, the black luminance of the base 11 does not increase, thereby preventing lowering of the contrast of the projection light reflected by the reflection films 12 with high efficiency. Accordingly, the contrast can be easily raised by the simple structure which has the plural anti-reflection films 13 containing the plural diagonally deposited transparent columnar components 13A on the areas of the concave portions 11A to which the projection light is not applied.

According to this embodiment, the anti-reflection films 13 are formed by diagonal deposition of $SiO_2$.

In this structure, the anti-reflection films 13 have a smaller refractive index than that of the anti-reflection films 13 made of other material. In addition, the anti-reflection films 13 have higher adhesion than that of the anti-reflection films 13 made of other material and thus can be formed even on the base 11 made of resin. Therefore, preferable contrast can be produced in a stable condition for a long period.

Moreover, the base 11 is black. In this case, external light applied to a part of the non-reflection areas where the anti-reflection films 13 are not formed, if any, is scarcely reflected by the corresponding part. Thus, decrease in the contrast caused by excessive rise of the black luminance of the screen 1 can be avoided.

According to this embodiment, the reflection films 12 are formed after the anti-reflection films 13 are provided. In this case, the reflection films 12 cover the entire reflection areas even when a part of the anti-reflection films 13 are formed on a part of the reflection areas. Accordingly, the reflection films 12 can be securely provided on the reflection areas, which avoids lowering of the reflection capability of the screen 1.

According to this embodiment, the reflection films 12 are formed only on the reflection areas by diagonal deposition from the position facing to the reflection areas of the respective concave portions 11A with self-alignment.

In this case, the reflection films 12 can be limitedly provided on the reflection areas only by diagonal deposition from the predetermined position without requiring processing such as masking and etching. Thus, the manufacturing efficiency improves.

The reflection films 12 are formed by deposition similarly to the reflection films 13. In this case, only one process of pressure reduction is required for deposition after the base 11 and the materials of both the anti-reflection films 13 and the reflection films 12 are prepared within the depositing device. Therefore, the efficiency of manufacturing the reflection-type screen 1 further improves by forming the reflection films 12 by deposition similarly to the anti-reflection films 13.

Furthermore, the concave portions 11A are provided on the base 11 according to this embodiment. Thus, compared with a structure which has convex portions, for example, a frictional force is not easily produced when the screen 1 is handled. Thus, damage such as separation of the reflection films 12 and the anti-reflection films 13 is not easily caused by the effect of the frictional force. Accordingly, stable characteristics continue for a long period.

Modified Examples

The invention is not limited to the embodiment described herein but includes modifications, improvements and the like without departing from the scope of the invention.

According to this embodiment, the reflection films 12 are formed with self-alignment by diagonal deposition. However, the reflection films 12 may be deposited on the reflection areas of the concave portions 11A by masking, or may be formed on the reflection areas by etching after deposited on the entire areas of the concave portions 11A. Alternatively, the anti-reflection films 13 may be formed on the non-reflection areas by diagonal deposition after deposition of the reflection films 12 on the entire areas of the concave portions 11A.

According to this embodiment, the structure which includes the concave portions 11A having the concave surfaces on the base 11 has been discussed as an example. However, a plurality of curved portions having convex surfaces may be provided on the base 11, for example. In case of the curved portions having convex surfaces, the reflection films 12 and the anti-reflection films 13 can be formed on the reflection areas efficiently reflecting projection light and on the non-reflection areas, respectively, by diagonal deposition in a manner similar to the manufacturing method described in this embodiment.

The curved portions having the convex surfaces are not required to have the uniform shapes similarly to this embodiment.

The reflection-type screen according to the invention is not limited to the type incorporated in the image projection system 3 shown in FIG. 1.

For example, the invention is applicable to a front projection television system 300 including a reflection-type screen 301, a projector 302, and a frame 303 as a frame body for supporting the screen 301 and the projector 302.

In addition, each of the screens 1 and 301 is not limited to a screen having a flat plate shape but may be a screen having a curved shape.

The manufacturing method of the base 11 is not limited to a method using the screen mold.

Also, the forming method of the base 11 is not limited to the method using spin-coating described above but may be various methods not using spin-coating such as extrusion molding.

Example

An example of the invention and a comparison example are now described for more specific explanation of the invention.

It should be understood that the invention is not limited to this example or associated descriptions shown herein.

Experiment 1

An experiment 1 was carried out to clarify the relationship between the material, the deposition direction, and the reflectance of the base 11.

Figure 8:
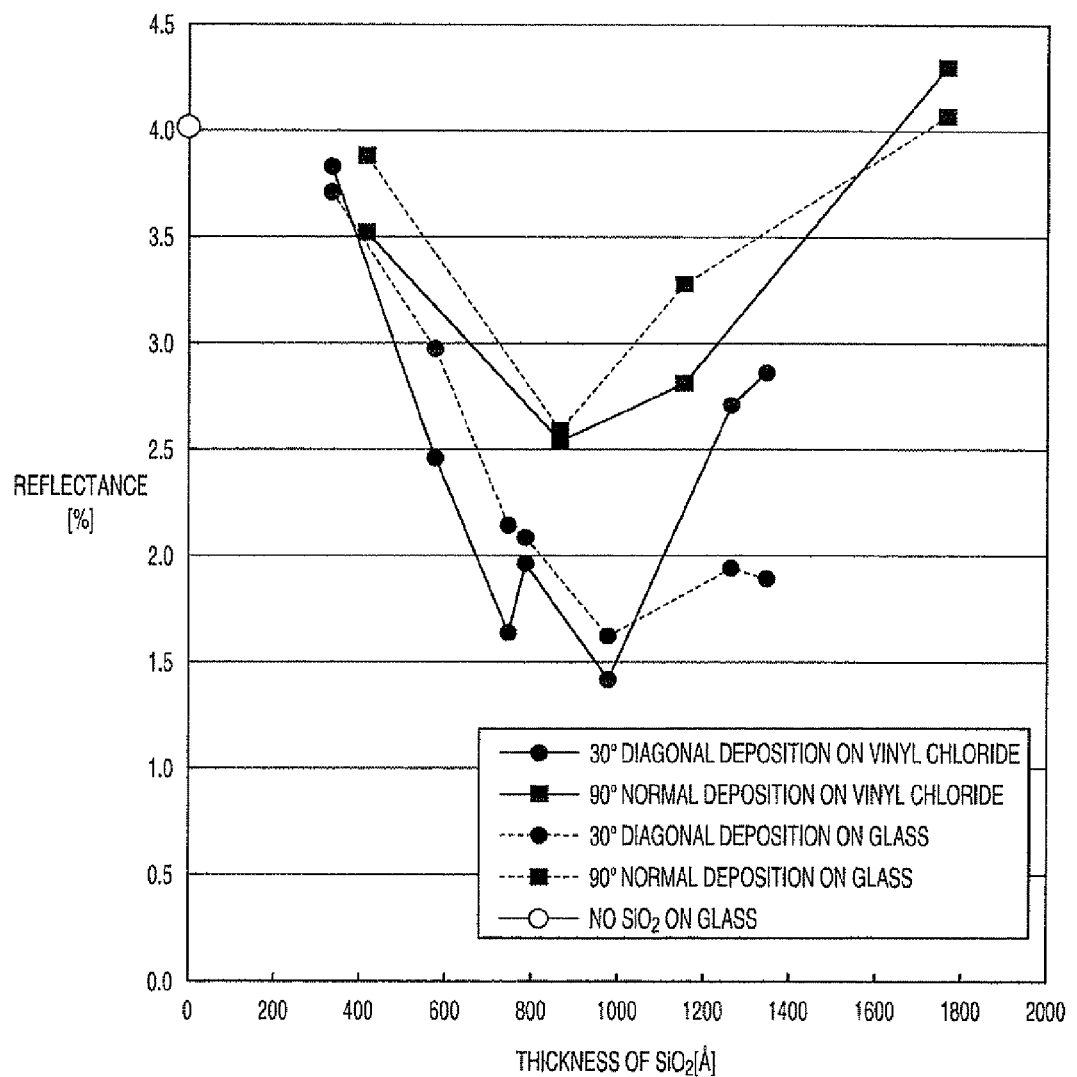
FIG. 8 is a graph showing the relationship between the thickness and the reflectance of silicon dioxide as material of the anti-reflection films according to an example of the invention.

In the experiment 1, a base made of vinyl chloride and a base made of glass were prepared. Then, diagonal deposition of $SiO_2$ on the base with inclination of 30° to the plane of the base, and normal deposition of $SiO_2$ on the base in the direction along the normal line crossing the plane of the base at right angles were performed. FIG. 8 shows the result of the experiment 1. FIG. 8 is a graph which has a horizontal axis representing the thickness of $SiO_2$ and a vertical axis representing the reflectance of $SiO_2$, as a graph showing the relationship between the thickness of $SiO_2$ and the reflectance of $SiO_2$ when $SiO_2$ is deposited in different directions on the bases made of different materials.

According to the experiment 1 shown in FIG. 8, the following tendency was recognized. When the thickness of $SiO_2$ is 400 angstroms, the reflectance of $SiO_2$ on each of the bases is not greatly different from reflectance (4%) of a base made of glass and having no deposition of $SiO_2$ as a blank base. However, the reflectance of each sample decreases when the thickness increases to reach the range from 800 to 1,000 angstroms. When the thickness becomes larger than 1,000 angstroms, the reflectance again increases.

This result shows that the preferable thickness of $SiO_2$ for deposition lies within the range from about 800 to about 1,000 angstroms.

When comparing the diagonal deposition and the normal deposition shown in the graph, the reflectance can be more largely decreased in case of diagonal deposition under the condition of the thickness in the range from 800 to 1,000 angstroms.

This result clarifies that the anti-reflection films formed by diagonal deposition can efficiently prevent reflection of external light, and thus can improve the contrast.

Moreover, compared with the base made of resin and subjected to diagonal deposition, the reflectance of the base made of glass and subjected to diagonal deposition does not greatly increase and provides a sufficient reflection preventive function even under the condition of a thickness larger than 1,000 angstroms.

Thus, the reflectance does not increase even in the front projection television system or other devices not requiring flexibility and thus having a large film thickness for satisfying the demand of high durability and the like. Accordingly, the structure in this example is advantageous for this type of application.

Experiment 2

An experiment 2 was carried out to clarify the relationship between the diagonal deposition angle and the refractive index of $SiO_2$.

Figure 9:
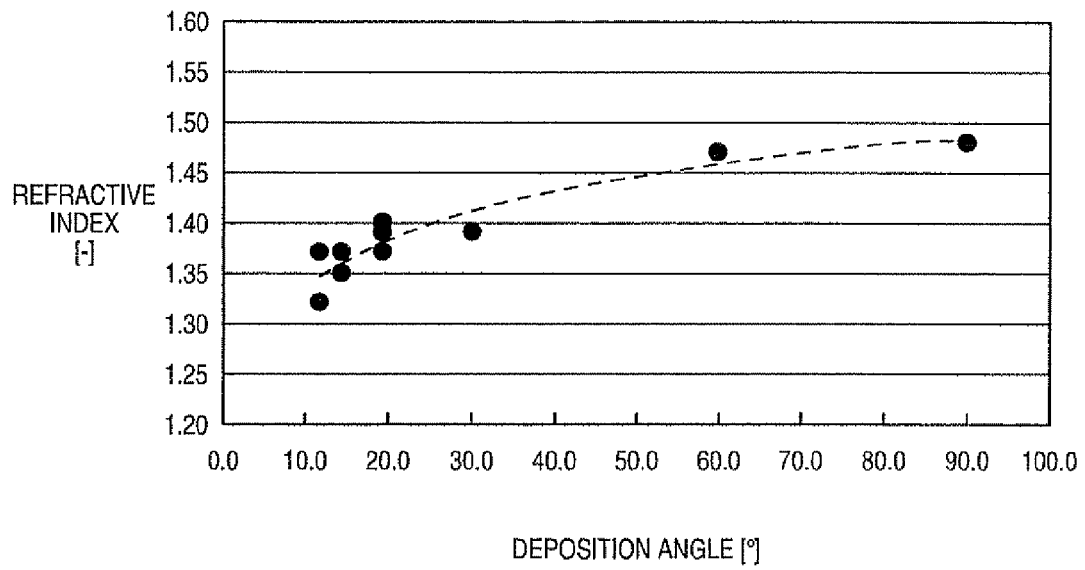
FIG. 9 is a graph showing the relationship between the diagonal deposition angle and the refractive index of silicon dioxide as material of the anti-reflection films according to the example of the invention.

In the experiment 2, SiO$_2$ was deposited on a base at different angles, and the refractive index was measured for each. FIG. 9 shows the result of the experiment 2. FIG. 9 is a graph which has a horizontal axis representing the diagonal deposition angle of SiO$_2$ and a vertical axis representing the refractive index of SiO$_2$ to show the relationship between the diagonal deposition angle and the refractive index of SiO$_2$.

As can be seen from FIG. 9, the recognized tendency was that the refractive index gradually lowers from the refractive index obtained by deposition in the direction along the normal line crossing the plane of the base at right angles as the deposition angle decreases. It was particularly clarified that the refractive index more greatly lowers at 30° and smaller angles. When the angle formed by the deposition direction and the plane of the base is smaller than 10°, SiO$_2$ was not deposited.

Accordingly, it is preferable that the diagonal deposition is performed at an angle of 10° or larger and smaller than 90°, more preferably at an angle in the range from 10° to 30° as the angle formed by the deposition direction and the plane of the base.

The entire disclosure of Japanese Patent Application No. 2010-90159, filed Apr. 9, 2010 is expressly incorporated by reference herein.

What is claimed is:

1. A reflection-type screen which reflects projection light comprising:
   a base one surface of which has a plurality of curved portions having concave or convex surfaces,
   wherein
   each of the curved portions of the base has a reflection area and a non-reflection area,
   a reflection film is formed on each of the reflection areas,
   an anti-reflection film is formed on each of the non-reflection areas, and
   each of the anti-reflection films has a plurality of transparent columnar components.

2. The reflection-type screen according to claim 1, wherein each of the anti-reflection films is made of silicon dioxide.

3. The reflection-type screen according to claim 1, wherein a clearance is produced between the anti-reflection film of one of the curved portions and the reflection film of the corresponding curved portion.

4. The reflection-type screen according to claim 1, wherein a part of the reflection film of one of the curved portions is laminated on the anti-reflection film of the corresponding curved portion.

5. The reflection-type screen according to claim 1, wherein the columnar components are formed by diagonal deposition.

6. The reflection-type screen according to claim 1, wherein the plural columnar components have moth-eye structure.

7. The reflection-type screen according to claim 1, wherein the thickness of the columnar components lies within the range from 800 to 1,000 angstroms.

8. The reflection-type screen according to claim 1, wherein each of the reflection films is formed by diagonal deposition.

9. The reflection-type screen according to claim 1, wherein each of the reflection films is made of aluminum.

10. The reflection-type screen according to claim 1, wherein the base is black.

11. A projection system comprising:
    the reflection-type screen according to claim 1; and
    a projector which projects projection light on the surface of the reflection-type screen on which the curved portions are provided.

12. A front projection television system, comprising:
    the reflection-type screen according to claim 1;
    a projection unit which projects projection light on the surface of the reflection-type screen on which the curved portions are provided; and
    a frame on which the reflection-type screen and the projection unit are held.

* * * * *